United States Patent [19]

Umemura et al.

[11] 4,437,882
[45] Mar. 20, 1984

[54] FERROMAGNETIC POWDER TREATED WITH AN ORGANIC SILANE COMPOUND

[75] Inventors: Shizuo Umemura; Akihiro Matsufuji; Masashi Aonuma; Tatsuji Kitamoto; Hajime Miyatsuka, all of Kanagawa, Japan

[73] Assignee: Fuji Photo Film Co., Ltd., Kanagawa, Japan

[21] Appl. No.: 517,304

[22] Filed: Jul. 26, 1983

[30] Foreign Application Priority Data

Jul. 26, 1982 [JP] Japan ................... 57-129024

[51] Int. Cl.$^3$ ................... B22F 9/22
[52] U.S. Cl. ................... 75/0.5 R; 75/0.5 BA; 75/0.5 AA; 75/251; 75/252
[58] Field of Search ................... 75/251, 252, 0.5 R, 75/0.5 BA, 0.5 BB

[56] References Cited

U.S. PATENT DOCUMENTS 3,846,118 11/1974 Ehhreich et al. ................ 75/0.5 AA
4,043,846 8/1977 Amemiya et al. ................ 75/0.5 AA Primary Examiner—W. Stallard
Attorney, Agent, or Firm—Sughrue, Mion, Zinn, Macpeak and Seas

[57] ABSTRACT

A ferromagnetic powder and process for producing it are disclosed. The process involves providing reducing a nickel-doped or nickel-coated iron compound in a reducing gas to provide a reduced metal powder including nickel in an amount of 3 to 30 atomic % based on the atomic % of iron present in the reduced metal powder, and treating the reduced metal powder with an organic metal powder. The resulting ferromagnetic metal powder has excellent stability with respect to oxidation and has a high saturation magnetization.

17 Claims, 1 Drawing Figure

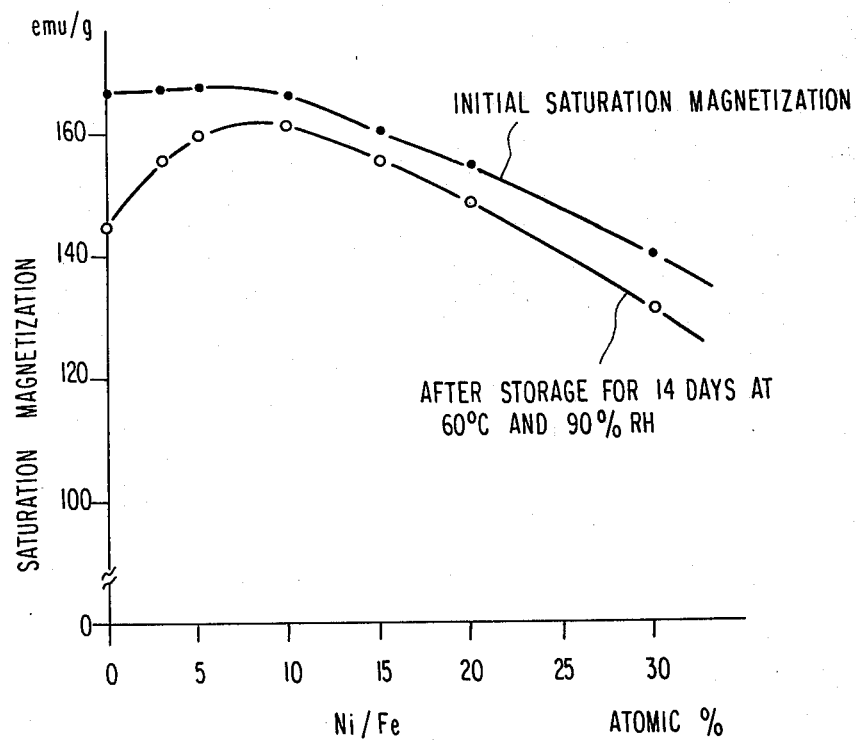

FERROMAGNETIC POWDER TREATED WITH AN ORGANIC SILANE COMPOUND

FIELD OF THE INVENTION

The present invention relates to a ferromagnetic metal powder, and more particularly to a ferromagnetic metal powder having excellent stability to oxidation which is useful for a magnetic recording medium.

BACKGROUND OF THE INVENTION

Ferromagnetic metal (or alloy) powder has been used as a ferromagnetic material for magnetic recording media. The metal powder contains iron, nickel and/or cobalt as a main component. The ferromagnetic metal powder is dispersed in an organic binder such as vinyl chloride-vinyl acetate copolymer, styrene-butadiene copolymer, epoxy resin or polyurethane resin to prepare a ferromagnetic coating composition, and then the composition is coated on a non-magnetic support to provide a magnetic recording medium. The magnetic powder is unstable, and can be particularly easily oxidized in air, while it can provide a magnetic recording medium having higher density than that of oxide type magnetic powders. The metal is dangerous in powder form because it is combustible. This tendency is greater if the ferromagnetic metal powder contains an iron. If the metal powder is oxidized in air its saturation magnetization is lowered.

Various methods for preparing ferromagnetic metal powders having an improved oxidation stability have been proposed. For example, one method comprises immersing a ferromagnetic metal powder in an organic solvent, allowing it to stand for long time at room temperature to evaporate the solvent and to form a film of oxide and thermal-treating it in air (Japanese Patent Application (OPI) No. 54998/77). Another method comprises introducing an oxygen-containing gas in an organic solvent containing a ferromagnetic metal powder to oxidize it (Japanese Patent Application (OPI) No. 85054/77). Still another method comprises treating an active metal powder with an oxidizing agent such as permangenete (Japanese Patent Application (OPI) No. 112465/76). However, these methods are not sufficient because some of them require long periods of time to carry out their steps, and some of them use complicated steps. Further, sufficient stability to oxidation is not obtained.

It has been proposed in Japanese Patent Application (OPI) No. 155398/77 that a metal powder be wet with an organic solvent containing a silicone oil and dried at 200° C. to 350° C. This method involves simple steps and provides a strong protective film or layer on the surface of the metal powder, whereby an anti-oxidation property is provided to some degree. However, magnetic powders having sufficient stability to oxidation are still not obtained.

SUMMARY OF THE INVENTION

An object of the invention is to provide a ferromagnetic metal powder having excellent stability to oxidation and a high saturation magnetization.

As the results of various research and development, the inventors have found that the object of the invention can be attained by treating a ferromagnetic metal powder with an organic silane compound, said metal powder being prepared by reducing a nickel-doped or nickel-coated iron compound in a reducing gas. That is, the most important point of the invention is that a nickel-containing ferromagnetic metal powder is treated with an organic silane compound. The treated metal powder has higher saturation magnetization and is more stable to oxidation than metal powder which is prepared by treating ferromagnetic metal powder which does not contain nickel with an organic silane compound.

Therefore, the present invention relates to a ferromagnetic metal powder obtained by treating with an organic silane compound a ferromagnetic metal powder which is prepared by reducing a nickel-doped or nickel-coated iron compound in a reducing gas.

BRIEF DESCRIPTION OF THE DRAWINGS

FIGURE is a graph showing the relationship between saturation magnetization and nickel content in the treated ferromagnetic metal powder of the present invention.

DETAILED DESCRIPTION OF PREFERRED EMBODIMENTS

Preferred nickel-doped or nickel-coated iron compounds used in the present invention include a nickel-doped or nickel-coated iron oxyhydroxide and a nickel-doped or nickel-coated iron oxide. These iron compounds may contain at least one of Co, Zn, Cu, Cr, Si and Mn, preferably Zn, Cr and Si, in a total amount of 0 to 30 atomic % based on the atomic % of Fe.

The iron compounds are reduced in a reducing gas in a conventional manner, e.g., using a hydrogen gas to obtain a nickel-containing ferromagnetic metal powder which generally has a length of 0.05 to 10 μm and an acicular ratio of 1 to 30.

It is not clear why ferromagnetic metal powders having high saturation magnetization and high stability to oxidation can be obtained by treating with an organic silane compound a nickel-containing ferromagnetic metal powder which is prepared by reducing a nickel-doped or nickel-coated iron compound in a reducing gas which may contain one of Co, Zn, Cu, Cr, Si and Mn. However, the excellent results of the invention cannot be obtained by treating a ferromagnetic metal powder containing a metal such as Co, Zn, Cu, Cr, Si or Mn other than Ni with the organic silane compound. In other words, the phenomena is obtained only by the use of nickel.

Further, the results of the invention are remarkable, as the amount of nickel is increased. In the invention, nickel is contained in an amount of 3 to 30 atomic %, preferably 3 to 20 atomic %, more preferably 5 to 15 atomic %, based on the atomic % of iron. If the amount of nickel is less than 3 atomic %, saturation magnetization of the resulting metal powder is high at an initial stage but is markedly deteriorated with a passage of time. If it exceeds 30 atomic %, an initial saturation magnetization markedly decreases and the deterioration in saturation magnetization becomes remarkable.

Typical examples of the organic silane compounds employed in the invention are those soluble in an organic solvent such as toluene and ethanol and capable of forming a layer on the surface of ferromagnetic metal powder, which include silicone oil, a silane coupling agent and a silicate. Useful silicone oils include dimethyl polysiloxane ("KF-96", manufactured by Shinetsu Chemical Industries Co., Ltd.), methylhydrogen polysiloxane ("KF-99") and methylphenyl silicone oil ("KF- 54"). Useful silane coupling agents include methyltrimethoxysilane, ethyltrimethoxysilane, propyltrimethoxysilane, methyltriethoxysilane, dimethyldimethoxysilane, diethyldimethoxysilane, dimethyldiethoxysilane, trimethylmethoxysilane, triethylmethoxysilane, vinyltriethoxysilane, and allyltriethoxysilane. Useful silicates include tetramethoxysilane, tetraethoxysilane, tetrapropoxysilane, tetrabutoxysilane, and tetraphenoxysilane. Of these, dimethyl polysiloxane, methylhydrogen polysiloxane and methylphenyl silicon oil are preferably used, and methylhydrogen polysiloxane is particularly preferred.

The silane compound is generally dissolved in an organic solvent in an amount of 0.05 to 10 wt% and preferably 0.1 to 5 wt%, and then applied to the nickel-containing ferromagnetic metal powder. The amount of silane compound on the metal powder is generally from 0.1 to 30 wt%, preferably from 0.5 to 10 wt%, more preferably from 0.5 to 5 wt%, based on the weight of metal powder.

The treated ferromagnetic metal powder is dried in air at a temperature of 20° to 100° C., preferably 20° to 60° C. and more preferably 20° to 40° C. The time for drying is not limited and varies depending on the drying temperature. For example, the treated ferromagnetic metal powder is dried at 30° C. for 2 to 24 hours, preferably 6 to 12 hours.

The ferromagnetic metal powder of the invention can be applied to a magnetic recording medium by dispersing it in an organic binder and coating it on a non-magnetic support. The compositions and methods for preparing such magnetic recording media are disclosed in Japanese Patent Publication No. 26890/81 and U.S. Pat. No. 4,135,016.

Useful non-magnetic supports include polyethylene terephthalate, polyethylene naphthalate, polyamide, polyimide, polycarbonate, polyvinyl chloride, triacetyl cellulose and those supports that are commonly used for magnetic recording media. A support having provided thereon a backing layer which contains a carbon black or an inorganic pigment and a binder also be used. A support which is vacuum evaporated with aluminum can also be used. If necessary, a support having coated thereon a surfactant or a lubricant and a support with surfaces having different smoothness can be used.

Useful binders include a copolymer of vinyl chlorides and vinyl acetate, cellulose derivative, polyurethane, nitrile-butadiene rubber, styrene-butadiene rubber, polyester, polyamide, polyisocyanate and those binders which are commonly used for magnetic recording media. Of these, a copolymer of vinyl chloride and vinyl acetate, cellulose derivative, polyurethane, polyisocyanate are preferred. The binder is preferably used in an amount of 5 to 100 parts by weight, more preferably 10 to 50 parts by weight based on 100 parts by weight of magnetic particles.

The thickness of the magnetic layer is generally from 1 to 20 μm, preferably from 2 to 10 μm and more preferably from 3 to 8 μm.

An abrasive, a lubricant, a dispersing agent, a stabilizing agent or a plasticizer can be added to the magnetic layer in a conventional manner generally used with magnetic recording media.

The invention will be explained more in detail by the following examples. However, the scope of the invention is not limited to these examples.

EXAMPLE 1

A geothite doped with 5 atomic % of nickel an having an average particle length of 0.4 μm and an acicular ratio of 20 was heated in a nitrogen gas at 500° C. for 2 hours, and was heated in a hydrogen gas at 350° C. for 4 hours to provide a nickel-containing metal powder. The powder was immersed in a toluene solution containing 0.5 wt% silicone oil ("KF-99" manufacture by Shinetsu Chemical Co., Ltd.) before it was exposed to the air, and then was dried in air at 40° C.

COMPARATIVE EXAMPLE 1

A geothite containing no nickel and having an average particle length of 0.4 μm and an acicular ratio of 20 was heated in a nitrogen gas at 500° C. for 2 hours, and was heated in a hydrogen gas at 370° C. for 4 hours to provide a metal powder. The powder was immersed in a toluene solution containing 0.5 wt% silicone oil ("KF-99") before it was exposed to the air, and then was dried in air at 40° C.

COMPARATIVE EXAMPLE 2

The metal powder prepared in the same manner as in Comparative Example 1 was immersed in a toluene solution containing 1.0 wt% silicone oil ("KF-99"), and then was dried in air at 40° C.

COMPARATIVE EXAMPLE 3

The metal powder prepared in the same manner as in Example 1 was immersed in toluene (containing no silicone oil), and then was dried in air at 40° C.

COMPARATIVE EXAMPLE 4

The metal powder prepared in the same manner as in Comparative Example 1 was immersed in toluene (containing no silicone oil), and then was dried in air at 40° C.

EXAMPLE 2

A geothite coated with 5 atomic % of nickel and having an average particle length of 0.4 μm and an acicular ratio of 20 was heated in a nitrogen gas at 500° C. for 2 hours, and then was heated in a hydrogen gas at 350° C. for 4 hours to provide a nickel-containing metal powder. The powder was immersed in a toluene solution containing 0.5 wt% silicone oil ("KF-99") before it was exposed to the air, and dried in air at 40° C.

The saturation magnetizations of thus obtained metal powders after production and after storage for 14 days in an atmosphere at 60° C. and 90 %RH were measured, and the results are shown in the following table.

TABLE

| | Initial saturation magnetization (emu/g) | Saturation magnetization after 14 days at 60° C. 90% RH (emu/g) |
|---|---|---|
| Example 1 | 168 | 160 |
| Comparative Example 1 | 167 | 145 |
| Comparative Example 2 | 161 | 152 |
| Comparative Example 3 | 159 | 138 |
| Comparative Example 4 | 157 | 134 |
| Example 2 | 167 | 158 |

It is apparent from the above table that the metal powder of the invention has higher saturation magnetization than conventional metal powders, and that it has more excellent stability to oxidation than conventional metal powders because of less deterioration with the passage of time.

EXAMPLE 3

A geothite doped with 0 to 30 atomic % of nickel was reduced in the same manner as in Example 1 to provide a metal powder. The powder was immersed in a toluene solution containing 0.5 wt% of silicone oil ("KF-99") before it was exposed to the air, and dried in air at 40° C.

The saturation magnetizations of each metal powder after production and after storage for 14 days in an atmosphere at 60° C. and 90 %RH were measured, and the results are shown in FIGURE.

It is apparent from FIGURE that the treated metal powders containing 3 to 30 atomic % of nickel has higher saturation magnetization with less deterioration with the passage of time.

While the invention has been described in detail and with reference to specific embodiment thereof, it will be apparent to one skilled in the art that various changes and modifications can be made therein without departing from the spirit and scope thereof.

What is claimed is:

1. A ferromagnetic metal powder, produced by the process comprising the steps of:
   reducing an iron compound selected from the group consisting of nickel-doped iron oxyhydroxide, nickel-coated iron oxyhydroxide, nickel-doped iron oxide and nickel-coated iron oxide in a reducing gas, to provide a reduced metal powder including nickel in an amount of 3 to 30 atomic % based on the atomic % of iron present in the reduced metal powder; and
   treating the reduced metal powder with an organic silane compound to provide a silane-treated powder.

2. A ferromagnetic metal powder, produced by the process as claimed in claim 1, wherein the reduced metal powder includes nickel in an amount of 3 to 20 atomc % based on the atomic % of iron present in the reduced metal powder.

3. A ferromagnetic metal powder, produced by the process as claimed in claim 1, wherein the reduced metal powder includes nickel in an amount of 5 to 15 atomic % based on the atomic % of iron present in the reduced metal powder.

4. A ferromagnetic metal powder, produced by the process as claimed in claim 1, wherein the reduced metal powder is treated with the organic silane compound such that the amount of organic silane compound provided on the reduced metal powder ranges from 0.1 to 30 wt% based on the weight of the reduced metal powder.

5. A ferromagnetic metal powder, produced by the process as claimed in claim 1, wherein the iron compound is further comprised of an element selected from the group consisting of Co, Zn, Cu, Cr, Si and Mn.

6. A ferromagnetic metal powder, produced by the process as claimed in claim 1, wherein the organic silane compound is selected from the group consisting of silicone oil, silane coupling agents and silicic acid esters.

7. A ferromagnetic metal powder, produced by the process as claimed in claim 6, wherein the organic silane compound is selected from the group consisting of dimethyl polysiloxane, methylhydrogen polysiloxane, methylphenyl silicone oil, methyltrimethoxysilane, ethyltrimethoxysilane, propyltrimethoxysilane, methyltriethoxysilane, dimethyldimethoxysilane, diethyldimethoxysilane, dimethyldiethoxysilane, trimethylmethoxysilane, triethylmethoxysilane, vinyltriethoxysilane, allyltriethoxysilane, tetramethoxysilane, tetraethoxysilane, tetrapropoxysilane, tetrabutoxysilane and tetraphenoxysilane.

8. A ferromagnetic metal powder, produced by the process as claimed in claim 1, further comprising the step of:
   drying the silane-treated powder at a temperature in the range of 20° C. to 100° C.

9. A process for producing a ferromagnetic metal powder, comprising the steps of:
   reducing an iron compound selected from the group consisting of nickel-doped iron oxyhydroxide, nickel-coated iron oxyhydroxide, nickel-doped iron oxide and nickel-coated iron oxide in a reducing gas, to provide a reduced metal powder including nickel in an amount of 3 to 30 atomic % based on the atomic % of iron present in the reduced metal powder; and
   treating the reduced metal powder with an organic silane compound to provide a silane-treated powder.

10. A process for producing a ferromagnetic metal powder as claimed in claim 9, wherein the reduced metal powder includes nickel in an amount of 3 to 20 atomic % based on the atomic % of iron in the reduced metal powder.

11. A process for producing a ferromagnetic metal powder as claimed in claim 9, wherein the reduced metal powder includes nickel in an amount of 5 to 15 atomic % based on the atomic % of iron in the reduced metal powder.

12. A process for producing a ferromagnetic metal powder as claimed in claim 9, wherein the reduced metal powder is treated with the organic silane compound such that the amount of organic silane compound provided on the reduced metal powder ranges from 0.1 to 30 wt% based on the weight of the reduced metal powder.

13. A process for producing a ferromagnetic metal powder as claimed in claim 9, wherein the reducing is carried out utilizing hydrogen as the reducing gas.

14. A process for producing a ferromagnetic metal powder as claimed in claim 9, wherein the iron compound is further comprised of an element selected from the group consisting of Co, Zn, Cu, Cr, Si and Mn.

15. A process for producing a metal powder as claimed in claim 9, wherein the organic silane compound is selected from the group consisting of silicone oil, silane coupling agents an silicic acid esters.

16. A process for producing a ferromagnetic metal powder as claimed in claim 15, wherein the organic silane compound is selected from the group consisting of dimethyl polysiloxane, methylhydrogen polysiloxane, methylphenyl silicone oil, methyltrimethoxysilane, ethyltrimethoxysilane, propyltrimethoxysilane, methyltriethoxysilane, dimethyldimethoxysilane, diethyldimethoxysilane, dimethyldiethoxysilane, trimethylmethoxysilane, triethylmethoxysilane, vinyltriethoxysilane, allyltriethoxysilane, tetramethoxysilane, tetraethoxysilane, tetrapropoxysilane, tetrabutoxysilane and tetraphenoxysilane.

17. A process for producing a ferromagnetic metal powder as claimed in claim 9, furhter comprising the step of:
   drying the silane-treated powder at a temperature in the range of 20° C. to 100° C.

* * * * *